M. A. BRUNO.
AMUSEMENT DEVICE.
APPLICATION FILED MAR. 14, 1922.
1,416,783.
Patented May 23, 1922.
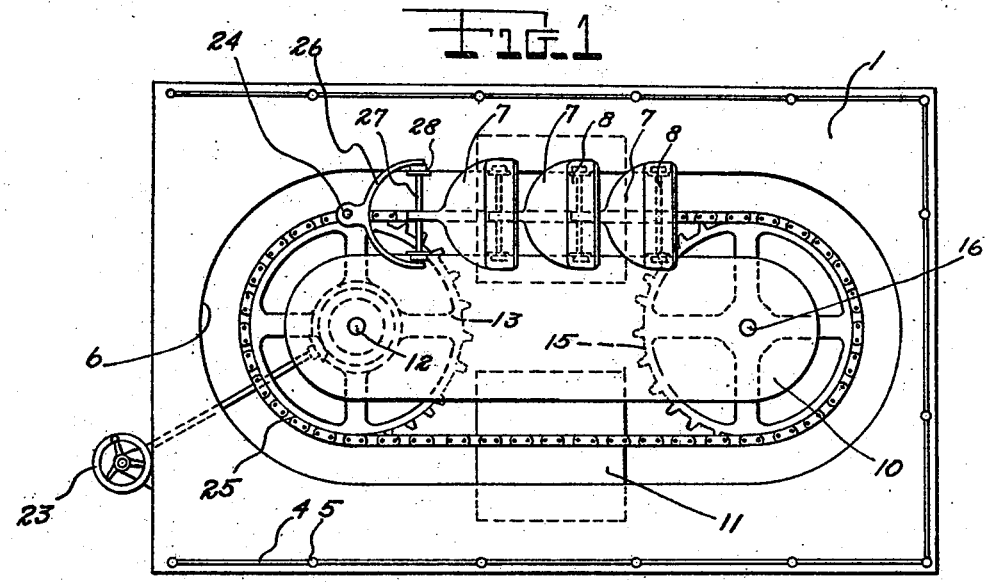
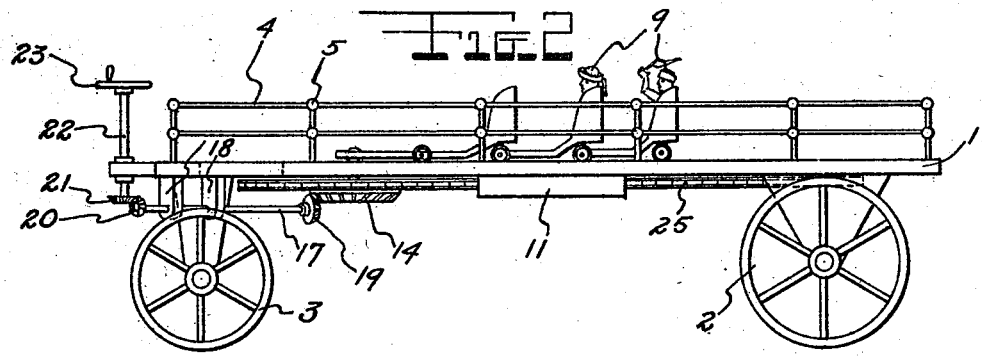
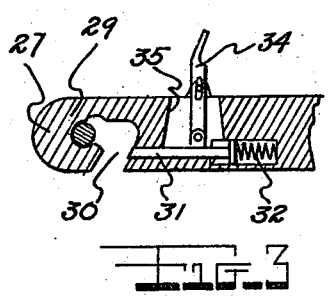
INVENTOR
M.A.Bruno
BY
ATTORNEY

UNITED STATES PATENT OFFICE.

MICHAEL A. BRUNO, OF BROOKLYN, NEW YORK.

AMUSEMENT DEVICE.

1,416,783.        Specification of Letters Patent.    Patented May 23, 1922.

Application filed March 14, 1922. Serial No. 543,675.

*To all whom it may concern:*

Be it known that I, MICHAEL A. BRUNO, a citizen of Italy, residing at Brooklyn, in the county of Kings and State of New York, have invented certain new and useful Improvements in Amusement Devices, of which the following is a specification.

This invention relates to amusement devices the main object being to provide a form of railway mounted on an endless track and propelled from a distant point. The device is primarily designed for the use and amusement of small children who are securely seated in a form railway car and are propelled around a track at a moderate speed.

Another object is to mount this device upon a vehicle so that the device can be driven from place to place. This, consequently makes the device portable and especially adaptable to the itinerant circus, which is continually on the move making short stops at brief intervals, during which time the device would generally be used.

The above and other objects will become apparent in the description below in which characters of reference refer to the like-named parts in the drawing.

Referring briefly to the drawing, Figure 1 is a top plan view of the amusement device.

Figure 2 is a side elevational view of the same.

Figure 3 is a fragmentary side elevational view of a means for detachably coupling two cars to each other.

Describing the drawing more in detail the numeral 1 indicates a substantially strong rectangular platform 1 which has the rear 2 and front 3 traction wheels mounted therebeneath in an approved manner.

A railing 4 supported by posts 5 extends around the edge of the main platform on three sides leaving the latter open at the front end. The platform has a longitudinal opening 6 which forms the outer edge of a runway for a chain of small passenger cars 7 which are equipped with seats 8 provided for the seating of children 9.

A central platform 10 supported by a pair of brace members 11, which span across the open track and are securely bolted to the outer platform 1. This central platform forms the inner running edge of a track. The ends of the track are curves generated from a central point so that travel thereon will be repeated or endless similar to the track and conforming therewith.

A vertical spindle 12 journalled in the front end of the central platform 10 has relatively large sprocket wheel 13 and a large beveled gear 14 securely fixed thereto. A sprocket wheel 15 of similar proportion to the first-named is fixed to a spindle 16 which is journalled at the rear end of the central platform. These sprocket wheels are connected to each other by an endless sprocket chain 25 and are so located as to have their peripheries centrally disposed between the track edges.

A horizontal shaft 17 rotating in bearing blocks 18 has a driver pinion gear 19 at one end which engages and rotates the front sprocket wheel 13. Said shaft has a small pinion 20 meshing with another 21 the latter being secured to the lower end of a driver shaft 22 which is surmounted by a hand wheel 23.

A strong puller pin 24 secured to one of the joints of chain 25 has a swivel yoke 26 which receives the projecting ends of an axle 27 provided with a pair of flanged traction wheels 28.

Each of the cars are similarly provided with a single pair of traction wheels and axles. The axle of each car forms a means by which the preceding car is coupled to the car immediately following it and comprises a coupler head 29 having an angular slot 30, open at the underside of the head. This couple is a forwardly projecting extension of the main frame and is provided with a locking bar 31 which has a large head behind which a spring 32 is housed in a suitable chamber. Said spring normally urges the bar 31 outwardly and across the slot 30 and is retracted or withdrawn by the rotation of a foot lever 33, pivoted at 34 and operating in a slot 35.

In use the cars 7 are placed upon the running edges of the track, and coupled to each other by operating the foot lever 33 and retracting locking bar 31 so that the slot 30 of each coupler head 29 can receive the axle 27 of each preceding car. Release of pressure on the foot levers will permit the locking of one car to another so that they will not uncouple while en route.

Rotation of hand wheel 23 will transmit a linear travel to sprocket chain 25 through the medium of the intermediate shaft 7 which rotates the large gear 14 and the driver sprocket wheel 13.

From the drawing it is obvious that the cars are movable independently of the traction wheels 2 and 3 and can therefore be used while the vehicle is at a standstill or while traveling.

I claim:

1. A device of the class described comprising a wheeled platform body having an opening therein, a central platform secured in said opening, a series of cars tractionally mounted on a runway formed by the platform members, a pair of large sprocket wheels rotatably mounted beneath the central platform and at the forward and rear ends thereof, a bevel gear mounted beneath the forward sprocket wheel, an endless sprocket chain engaging and encircling both sprocket wheels and adapted to linear travel when said sprocket wheels are rotated, means driving the forward sprocket wheel and means for releasably coupling the cars to each other.

2. A device of the class described comprising a wheeled platform body, a chain of cars mounted on said platform, a pair of sprocket wheels rotatably mounted beneath said platform, a chain engaging said sprocket wheels and having the front end of the cars swivelly secured thereto, a beveled gear secured beneath one of said sprocket wheels, a horizontal shaft member rotatable beneath said platform having beveled pinions secured to its ends, one of said pinions adapted to mesh with the sprocket wheel gear, a vertical driver shaft and pinion engaging the other pinion, a hand-wheel surmounting said driver shaft and adapted to effect a linear travel of the sprocket chain, means coupling the cars to each other and means for uncoupling the same.

3. A device of the class described comprising a wheeled platform body having track formed therein, a chain mounted centrally between said runway on a pair of sprocket wheels, a chain of axled cars coupled to each other and swivelly secured to the sprocket chain, said coupling means comprising a coupler head having an angular slot therein which is adapted to receive the axle of the preceding car, a locking bar slidable in said head, a spring normally urging said locking bar to span said slot, an upwardly extending fulcrumed foot lever, engaging said locking bar and adapted to retract the locking bar and open said slot when pressure is applied and means for effecting a linear travel of the cars.

In witness whereof I, affix my signature

MICHAEL A. BRUNO.